(12) United States Patent
Kuk et al.

(10) Patent No.: US 9,798,177 B2
(45) Date of Patent: Oct. 24, 2017

(54) DISPLAY APPARATUS INCLUDING TOUCH PANEL FIXING A DISPLAY PANEL TO A BACKLIGHT UNIT

(71) Applicant: Samsung Display Co., Ltd., Yongin-Si, Gyeonggi-Do (KR)

(72) Inventors: Seung-won Kuk, Cheonan-si (KR); Jikhan Jung, Seoul (KR); Yeon-sung Kim, Suwon-si (KR); Cheonghun Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 193 days.

(21) Appl. No.: 14/878,028

(22) Filed: Oct. 8, 2015

(65) Prior Publication Data
US 2016/0282652 A1   Sep. 29, 2016

(30) Foreign Application Priority Data
Mar. 24, 2015   (KR) .................. 10-2015-0040974

(51) Int. Cl.
*G02F 1/1333* (2006.01)
*G02F 1/1345* (2006.01)

(52) U.S. Cl.
CPC ...... *G02F 1/13338* (2013.01); *G02F 1/13452* (2013.01); *G02F 1/133308* (2013.01)

(58) Field of Classification Search
CPC .................. G02F 1/13338; G02F 1/133615
See application file for complete search history.

(56) References Cited

U.S. PATENT DOCUMENTS

| | | | |
|---|---|---|---|
| 9,619,055 B2* | 4/2017 | Matsumoto | G06F 3/041 |
| 2010/0110033 A1* | 5/2010 | Sakai | G06F 3/045 345/173 |
| 2010/0245706 A1* | 9/2010 | Oohira | G02F 1/133308 349/58 |
| 2014/0192278 A1* | 7/2014 | Esaka | G06F 3/044 349/12 |

FOREIGN PATENT DOCUMENTS

| | | |
|---|---|---|
| KR | 1020070044721 A | 4/2007 |
| KR | 1020080071637 A | 8/2008 |
| KR | 1020100011849 A | 2/2010 |
| KR | 1020120118372 A | 10/2012 |
| KR | 1020130046240 A | 5/2013 |
| KR | 1020130063094 A | 6/2013 |
| KR | 1020140110539 A | 9/2014 |

* cited by examiner

*Primary Examiner* — Timothy L Rude
(74) *Attorney, Agent, or Firm* — Cantor Colburn LLP

(57) ABSTRACT

A display apparatus includes a display panel, a backlight unit and a touch panel. The backlight unit generates and provides light and is disposed below the display panel to provide the light to the display panel. The touch panel includes a base film attached to a top surface of the display panel. The base film defines a base portion thereof which is overlapped with the display panel. The base portion which is overlapped with the display panel is extended to define a dummy wing portion of the base film. The dummy wing portion is bent from the display panel to a side surface of the backlight unit to be fixed to the side surface of the backlight unit.

18 Claims, 4 Drawing Sheets

DISPLAY APPARATUS INCLUDING TOUCH PANEL FIXING A DISPLAY PANEL TO A BACKLIGHT UNIT

This application claims priority to Korean Patent Application No. 10-2015-0040974, filed on Mar. 24, 2015, and all the benefits accruing therefrom under 35 U.S.C. §119, the entire contents of which are hereby incorporated by reference.

BACKGROUND (1) Field

The invention herein relates to a display apparatus, and more particularly, to a display apparatus for which a top chassis is omitted.

(2) Description of the Related Art

Flat panel display devices such as a liquid crystal display ("LCD") device, a plasma display panel ("PDP"), a field emission display ("FED") device, a light emitting diode ("LED") display device, and an organic light emitting diode ("OLED") display device have been developed.

Among these flat panel display devices, LCD devices have advantages such as a technological advance in mass production, relative ease of driving thereof, relatively low power consumption, relatively small thickness, and realization of a relatively high-quality image displayed on a relatively large screen, and therefore secure a firm consumer market and expand fields to which they are applied.

Typically, the LCD device requires a planar area for supporting a weight of a liquid crystal panel, which limits reduction of a planar area of a bezel of the LCD device. Accordingly, in the LCD device, a case top covers an edge of an outer portion of a display screen of the LCD device and resultantly lowers a satisfaction level of a consumer regarding an exterior design of the LCD device.

Consistent with an increase in research and development for improving technologies for flat panel display devices, demands for improving design of the flat panel display devices to satisfy consumers has also become important.

SUMMARY

One or more exemplary embodiment of the invention provides a display apparatus in which a separate top chassis is omitted to reduce an overall cross-sectional thickness and planar size of the a bezel and also to reduce manufacturing costs.

One or more exemplary embodiment of the invention also provides a display apparatus in which a separate flexible printed circuit board connected to a touch panel is omitted to reduce manufacturing costs and simplify a manufacturing process.

One or more exemplary embodiment of the invention provides display apparatuses including a display panel, a backlight unit and a touch panel.

The display panel displays an image. The backlight unit generates and provides light and is disposed below the display panel to provide the light to the display panel. The touch panel detects a touch input to the display apparatus.

The touch panel includes a base film attached to a top surface of the display panel. The base film defines a base portion thereof which is overlapped with the display panel. The base portion which is overlapped with the display panel is extended to define a dummy wing portion of the base film. The dummy wing portion is bent from the display panel to a side surface of the backlight unit to be fixed to the side surface of the backlight unit.

In some embodiments, the base portion which is overlapped with the display panel may be further extended to define a touch wing portion. The touch wing portion may be spaced apart from the dummy wing portion. The touch panel may further include a touch electrode disposed on the base portion which is overlapped with the display panel and a touch pad disposed on the touch wing portion and connected to the touch electrode.

In other embodiments, the display apparatus may include a printed circuit board disposed under the backlight unit. The touch wing portion may be bent from the display panel to be attached to the printed circuit board disposed under the backlight unit.

In still other embodiments, the base portion, the touch wing portion and the dummy wing portion may be integral with each other.

The touch wing portion and the dummy wing portion may each be extended from a same side of the base portion of the base film. The touch wing portion may have a first length in a direction perpendicular to an extension direction of the same side of the base portion. The dummy wing portion may have a second length less than the first length in the direction perpendicular to the extension direction of the same side of the base portion.

In yet other embodiments, the backlight unit may further include a bottom chassis, a middle mold, a light guide plate and a light source unit. The bottom chassis may include a bottom surface, and a sidewall extending from an edge of the bottom surface. The middle mold may be connected to an outer portion of the bottom chassis to support the display panel thereon. The light guide plate may be accommodated in the bottom chassis and guide incident light to emit the incident light toward the display panel. The light source unit may provide light to the light guide plate.

In further embodiments, the dummy wing portion which is bent from the display panel to the side surface of the backlight unit may be fixed to the middle mold of the backlight unit.

In still further embodiments, the display apparatus may further include an adhesive part disposed between the dummy wing portion and the middle mold to fix the dummy wing portion to the middle mold. In even further embodiments, the adhesive part may be optical clear adhesive ("OCA") or optical clear resin ("OCR").

In yet further embodiments, the display apparatus may further include a coupling member passing through the dummy wing portion and inserted into the middle mold to fix the dummy wing portion to the middle mold. In much further embodiment, the coupling member may be a rivet or a screw.

In other embodiments of the invention, the display apparatuses include a display panel, a backlight unit and a touch panel. The display panel displays an image. The backlight unit generates and provides light and is disposed below the display panel to provide light to the display panel. The touch panel senses a touch input to the display apparatus and is attached to the display panel. Portions of the touch panel attached to the display panel are bent in a thickness direction of the display panel to be fixed to a side surface of the backlight unit.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
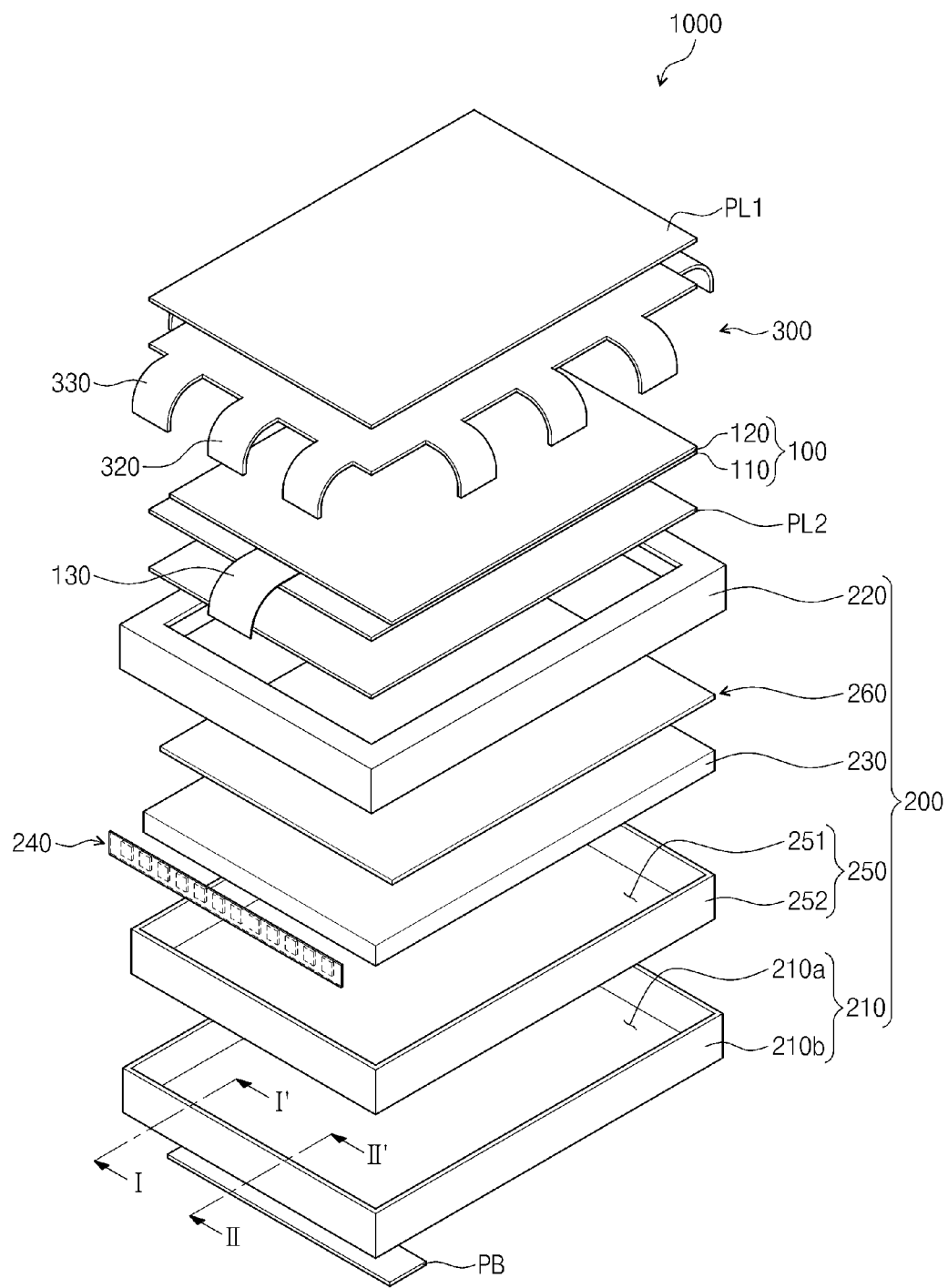
FIG. 1 is an exploded perspective view of an exemplary embodiment of a display apparatus according to the invention.

Exemplary embodiments of the invention will be described below in more detail with reference to the accompanying drawings. The invention may, however, be embodied in different forms and should not be construed as limited to the exemplary embodiments set forth herein. Rather, the invention should be understood to be intended to include the structural and functional equivalents of the matter. In the following description of the invention, a detailed description of known functions and configurations incorporated herein will be omitted to avoid making the subject matter of the invention unclear and, in every possible case, like reference numerals are used for referring to the same or similar elements in the description and drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Efforts to reduce an overall thickness (e.g., to make slimmer) a flat panel display device are continuously progressing. Also, research and development on a relatively narrow bezel type liquid crystal display device having a decreased a planar area of an edge of an outer portion of the liquid crystal display device (e.g., the bezel) is in progress such that a borderless type liquid crystal display device for which there is essentially no outer edge is being developed.

Figure 2:
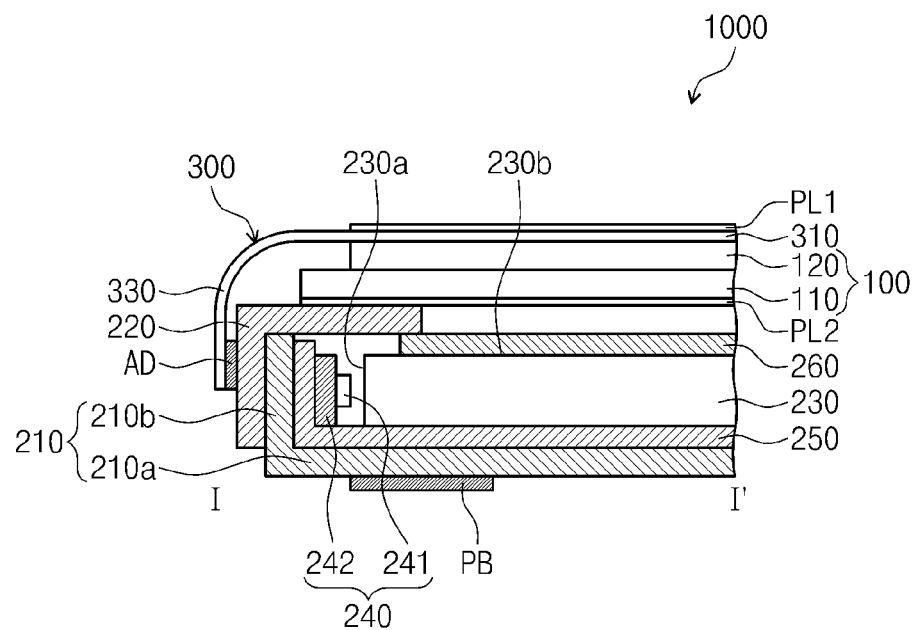
FIG. 2 is a cross-sectional view taken along line I-I' of FIG. 1.
Figure 3:
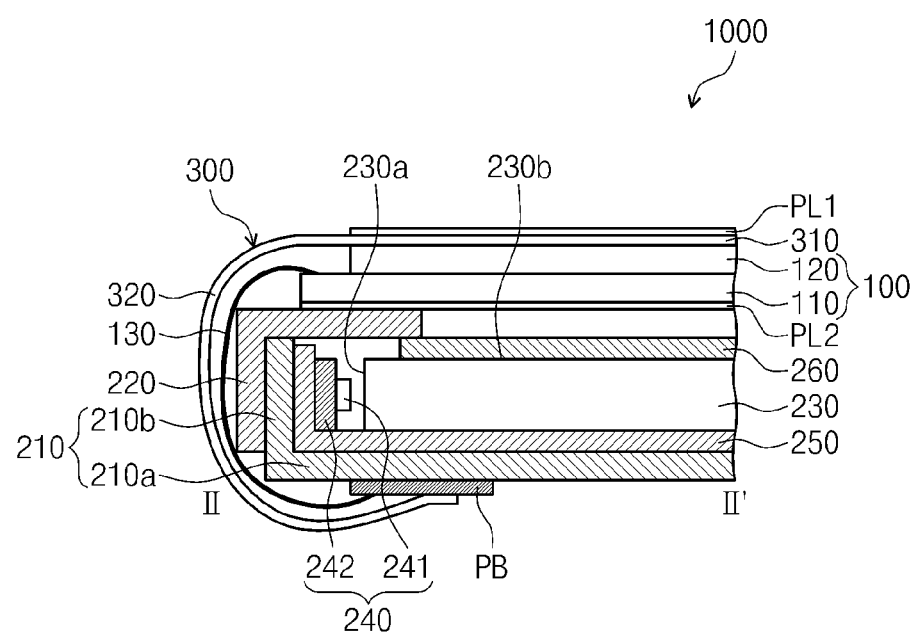
FIG. 3 is a cross-sectional view taken along line II-II' of FIG. 1.

FIG. 1 is an exploded perspective view of an exemplary embodiment of a display apparatus according to the invention, FIG. 2 is a cross-sectional view taken along line I-I' of FIG. 1, and FIG. 3 is a cross-sectional view taken along line II-II' of FIG.

Referring to FIGS. 1 to 3, a display apparatus 1000 may include a display panel 100, a backlight unit 200 and a touch panel 300.

The display panel 100 displays an image. The display panel 100 may include a non-emitting type display panel instead of a self-emitting type display panel such as an organic light emitting display panel. Although the display panel 100 may include various non-emitting type display panels, description will be given below by exemplifying the display panel 100 as a liquid crystal display panel which is a non-emitting type display panel.

The display panel 100 may include a first display substrate 110, a second display substrate 120 facing the first display substrate 110, and an optical medium such as a liquid crystal layer disposed therebetween.

The first display substrate 110 may include gate lines, data lines, thin film transistors and a pixel electrodes on a first base substrate. The gate lines and the data lines may be insulated from and crossed with each other. A thin film transistor, which may be a three-terminal device, is connected to a gate line, a data line and a pixel electrode among the pluralities thereof. According to a signal applied to the gate line, a data voltage applied to the data line may be applied to the pixel electrode by the thin film transistor connected to the gate line, the data line and the pixel electrode.

The second display substrate 120 may be disposed between the first display substrate 110 and the touch panel 300. The second display substrate 120 may face the first display substrate 110 with the liquid crystal layer disposed therebetween. Although the second display substrate 120 may include a color filter and a common electrode on a second base substrate, the invention is not limited thereto. In an another exemplary embodiment, for example, the first display substrate 110 may include the color filter and the common electrode instead of the second display substrate 120.

In the planar or plan view, the second display substrate 120 may have an overall size less than that of the first display substrate 110. A portion of the larger-size first display substrate 110 may be exposed by the smaller-size second display substrate 120.

The liquid crystal layer may include a plurality of liquid crystal molecules for which orientation states thereof are changed according to an electric field formed between the first display substrate 110 and the second display substrate 120.

The display apparatus 1000 may further include a driving circuit film 130 and a printed circuit board PB.

The driving circuit film 130 is bent in a length direction thereof to electrically connect the display panel 100 to the printed circuit board PB. The driving circuit film 130 may include a first end connected to a surface of the first display substrate 110 exposed by the second display substrate 120 and an opposing second end connected to the printed circuit board PB.

The printed circuit board PB may be disposed under the backlight unit 200. The printed circuit board PB may output a signal to the display panel 100 through the driving circuit film 130 and/or receive a signal from the display panel 100.

The display apparatus 1000 may further include a pair of polarizing plates PL1 and PL2 disposed over and below the display panel 100.

The backlight unit 200 is disposed below the display panel 100 to generate light and provide the generated light to the display panel 100.

The backlight unit 200 may include a bottom chassis 210, a middle mold 220, a light guide plate 230, a light source unit 240, a heat extrusion bar (or heat extrusion chassis) 250 and one or more optical sheets 260.

The bottom chassis 210 includes a bottom surface 210a and a sidewall 210b which extends from an edge of the bottom surface 210a. The bottom chassis 210 may define an accommodation (e.g., receiving) space defined by the bottom surface 210a and the sidewall 210b, and may accommodate the light guide plate 230, the light source unit 240, the heat extrusion bar 250 and the optical sheets 260 in the accommodation space thereof.

The middle mold 220 may be coupled to an outer portion of the bottom chassis 210 to be disposed outside the bottom chassis 210. In detail, the middle mold 220 may include a first portion elongated to extend along and face the sidewall 210b of the bottom chassis 210 and a second portion extended from the first portion to be bent over an upper portion of the sidewall 210b toward the accommodation space. The middle mold 220 may support the display panel 100 thereon. The middle mold 220 may have a frame shape in the plan view, for which an open portion is defined by the second portion thereof to expose underlying elements of the display apparatus 1000.

Although the bottom chassis 210 and the middle mold 220 are shown as separate elements in the exemplary embodiment, the invention is not limited thereto. In an exemplary embodiment, for example, the bottom chassis 210 and the middle mold 220 may be integral with each other, that is, not being separate elements from each other.

The light guide plate 230 may be disposed in the accommodation space. The light guide plate 230 may be disposed above the bottom surface 210a. The light guide plate 230 may include an incident surface 230a and an emission surface 230b. The incident surface 230a is a surface into which light emitted from the light source unit 240 is incident, and the emission surface 230b is a surface from which the light passing through the incident surface 230a is guided and emitted toward the display panel 100.

The light source unit 240 includes a light source 241 and a light source PCB 242. At least one light source 241 is provided and mounted on the light source PCB 242 to receive a power from the light source PCB 242 and thereby emit light. The light source 241 may be a light emitting diode ("LED"). The light source PCB 242 receives a power for driving the light source 241 from the outside thereof and transfers the power to the light source 241.

Although the light source 241 is shown as a LED in the exemplary embodiment, the light source 241 may be a cold cathode fluorescent lamp ("CCFL") or a flat fluorescent lamp ("FEL").

Although only one light source unit 240 is illustrated in the exemplary embodiment of FIGS. 1 to 3, the invention is not limited thereto. In an exemplary embodiment, for example, at least two light source units 240 may be provided. In FIGS. 1 to 3, although the light source unit 240 has an edge type structure and is thus disposed to correspond to a side surface of the light guide plate 230, the invention is not limited thereto.

The heat extrusion bar (which may be otherwise referred to as a heat extrusion chassis) 250 fixes the light source unit 240 with respect to other elements of the display apparatus 1000 and discharges heat generated from the light source unit 240.

The heat extrusion bar 250 may include a heat extrusion bottom portion 251 and a heat extrusion sidewall portion 252. The heat extrusion bottom portion 251 may be disposed under the light guide plate 230 and have a shape corresponding to the shape of the light guide plate 230 when viewed from the top (e.g., in the top plan view). The heat extrusion sidewall portion 252 extends from the heat extrusion bottom portion 251. The light source unit 240 may be coupled to an inner surface of the heat extrusion sidewall portion 252. Although the heat extrusion bar 250 may include or be made of metal having excellent heat conductivity such as aluminum or aluminum alloy, and may formed through various manufacturing methods such as pressing, plating and casting, the invention is not limited thereto. In an exemplary embodiment, for example, the heat extrusion bar 250 may have shapes.

The optical sheets 260 are disposed on the light guide plate 230 so as to increase the efficiency of light emitted from the emission surface 230b of the light guide plate 230. In detail, the optical sheets 260 may be disposed on the middle mold 220. The optical sheets 260 may include at least one of a diffusion sheet, a light collection sheet and a protection sheet. The diffusion sheet may diffuse incident light. The light collection sheet may increase the luminance of light diffused from the diffusion sheet. The protection sheet may protect the light collection sheet and secure a viewing angle from a viewing side of the display apparatus 1000.

Although not shown, the backlight unit 200 may further include a reflection sheet disposed below the light guide plate 230. The reflection sheet (not shown) may re-reflect incident light transmitted through a bottom surface of the light guide plate 230 opposite to the emission surface 230b and toward the light guide plate 230.

The touch panel 300 is disposed on the display panel 100. The touch panel 300 may sense a touch input to the display apparatus 1000. Although the touch panel 300 may operate in capacitive type, the invention is not limited thereto. In an exemplary embodiment, for example, the touch panel 300 may operate in resistive film type.

The touch panel 300 may be attached to a top surface of the display panel 100 and fixed to a side surface of the backlight unit 200. An adhesive layer may be disposed between a portion of the touch panel 300 and the display panel 100 to attach the touch panel 300 to the top surface of the display panel 100. The adhesive layer may be optical clear adhesive ("OCA") or optical clear resin ("OCR").

Figure 4:
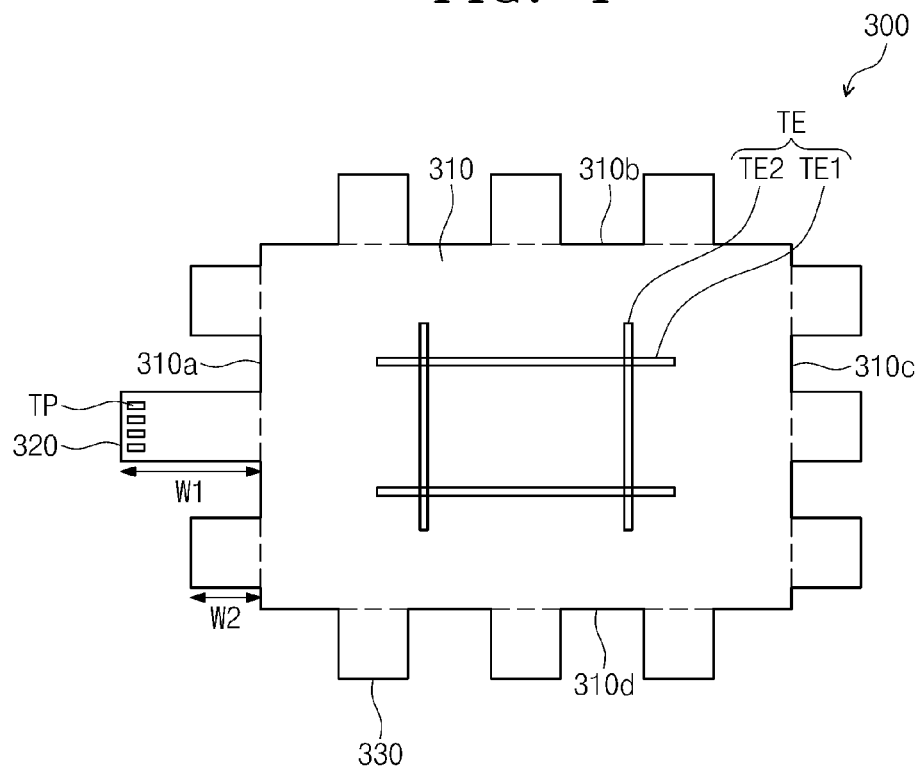
FIG. 4 is a plan view of an exemplary embodiment of a touch panel indicated in FIGS. 1 to 3.

FIG. 4 is a plan view of a touch panel 300 in FIGS. 1 to 3. FIG. 4 illustrates an unbent state of the touch panel 300.

Referring to FIGS. 1 to 4, the touch panel 300 may include a base portion 310 in the form of a film, a touch wing portion 320, a dummy wing portion 330, a touch electrode TE and a touch pad TP.

The base portion 310 may be attached to a top surface of the second display substrate 120. The base portion 310 may include a transparent or translucent flexible film. The base portion 310 may have the same shape as the top surface of the second display substrate 120. In FIG. 4, it is illustrated that the base portion 310 has a rectangular shape from the plan view. The base portion 310 may have first to fourth sides 310a to 310d which define the rectangular shape.

The touch electrode TE may be disposed on the base portion 310 as a collection of individual touch electrodes. The collection of touch electrode TE may include first touch electrodes TE1 and second touch electrodes TE2. The first touch electrodes TE1 and the second touch electrodes TE2 may be insulated from and crossed with each other on the base portion 310. Although each of the first and second touch electrodes TE1 and TE2 is provided in a rectangular shape as illustrated in FIG. 4, the invention is not limited thereto. In an exemplary embodiment, for example, each of the first and second touch electrodes TE1 and TE2 may have a shape in which diamond shaped patterns are connected in one direction or a shape in which patterns having a mesh shape in a diamond are connected in one direction.

A touch signal may be applied to the first and second touch electrodes TE1 and TE2, and a touch pressure may be detected on the basis of variations of the applied touch signals.

The touch wing portion 320 may extend from the base portion 310. The touch wing portion 320 and the base portion 310 may be integral with each and each are in a film form. As being integral, portions of the same touch panel 300 define the base portion 310 and the touch wing portion 320 which extends from the base portion 310.

The touch wing portion 320 may have a length extended in a direction perpendicular to each of the first to fourth sides 310a to 310d from at least one of the first to fourth sides 310a to 310d of the base film 310. Although only one touch wing portion 320 is illustrated and extends from the first side 310a in FIG. 4, the invention is not limited thereto.

In an exemplary embodiment, for example, the touch wing portion 320 may be provided in plurality by extending from at least two of the first to fourth sides 310a to 310d. Alternatively, a single one of the touch wing portion 320 may be extended from one of the second to fourth sides 310b to 310d instead of the first side 310a.

Referring to FIGS. 1 and 3, the touch wing portion 320 may be bent in a length direction thereof toward a lower side of the display panel 100 and attached to the printed circuit board PB.

The touch pad TP may be provided in plural and disposed on the touch wing portion 320. The touch pads TP may be respectively connected to the first touch electrodes TE1 and the second touch electrodes TE2. The touch pads TP may be attached to the printed circuit board PB where the touch wing portion 320 is in a bent state. The touch panel 300 may be electrically connected to the printed circuit board PB through attachment of the touch pads TP to the printed circuit board PB.

Although not shown, the display apparatus 1000 may further include an integrated touch circuit chip. Although the integrated touch circuit chip may be mounted on the printed circuit board PB to apply touch signals to the touch electrodes TE through the touch pads TP, the invention is not limited thereto. In an exemplary embodiment, for example, the integrated touch circuit chip may be mounted on the touch wing portion 320 to provide touch signals to the touch electrodes TE, and electrically connected to the printed circuit board PB through the touch pads TP.

The touch wing portion 320 of the touch panel 300 according to one or more exemplary embodiment of the invention functions as a flexible printed circuit board. The flexible printed circuit board which is used in a conventional display device may be omitted in one or more exemplary embodiment of the invention since the touch pads TP are provided on the touch wing portion 320 and connecting the touch pads TP to the printed circuit board PB. Since the touch wing portion 320 and the base portion 310 are integral with each other as being defined by portions of the touch panel 300, additional manufacturing cost is not required.

For a conventional display apparatus, when a touch panel and a printed circuit board are electrically connected to each other by using a flexible printed circuit board, an additional process of bonding the flexible printed circuit board to the touch panel is performed in manufacturing the display apparatus. In contrast, the touch panel 300 according to one or more exemplary embodiment of the invention, however, the base portion 310 and touch wing portion 320 are integral with each other as being defined by portions of the touch panel 300, thereby reducing the number of bonding processes. Accordingly, in the display apparatus 1000 including the touch panel 300 according to one or more exemplary embodiment of the invention, manufacturing costs may be reduced and a manufacturing process may be simplified.

The dummy wing portion 330 may extend from the base portion 310 and be spaced from the touch wing portion 320 along a respective side of the base portion 310. The dummy wing portion 330 and the base portion 310 may be integral with each and each are in a film form. As being integral, portions of the same touch panel 300 define the base portion 310, the touch wing portion 320 which extends from the base portion 310 and the dummy wing portion 320 which extends from the base portion 310.

The dummy wing portion 330 may have a length extended in a direction perpendicular to each of the first to fourth sides 310a to 310d from at least one of the first to fourth sides 310a to 310d of the base film 310. The dummy wing portion 330 may be provided in plurality. FIG. 4 illustrates a structure in which two dummy wing portions 330 extend from the first side 310a, and three dummy wing portion 330 extend from each of the second to fourth sides 310b to 310d.

Referring to FIGS. 1 and 2, the dummy wing portion 330 may be bent in a length direction thereof toward a lower side of the display panel 100 and fixed to a side surface of the backlight unit 200. The dummy wing portion 330 may be fixed to the middle mold 220, but the invention is not limited thereto.

In an exemplary embodiment of the invention, the display apparatus 1000 may further include an adhesion part AD disposed between the dummy wing portion 330 and the middle mold 220, and the dummy wing portion 330 and the middle mold 220 may be attached to each other through the adhesion part AD. The adhesion part AD may be OCA or OCR.

The touch wing portion 320 may have a first length W1, and the dummy wing portion 330 may have a second length W2 less than the first length W1. The first length W1 and the second length W2 may be measured in a direction perpendicular to an extension direction of a side of the base portion 310 from which each of the touch wing portion 320 and the dummy wing portion 330 is extended. Since the touch wing portion 320 may be attached to the printed circuit board PB disposed below the backlight unit 200 and the dummy wing portion 330 is connected to a side surface of the backlight unit 200, the touch wing portion 320 may have a length greater than that of the dummy wing portion 330.

In the display apparatus 1000 according to an exemplary embodiment of the invention, the touch panel 300 may be firmly fixed to the display panel 100 via the base portion 310 and firmly fixed to the backlight unit 200 via the dummy wing portion 330. That is, in one or more exemplary embodiment of the display apparatus 1000 of the invention, a separate conventional top chassis for fixing the display panel 100 and the backlight unit 200 to each other is omitted. Accordingly, with a separate top chassis omitted, an overall cross-sectional thickness and a planar size of a bezel of the display apparatus 1000 may decrease and the manufacturing costs may be reduced.

Although not shown, the display apparatus 1000 may further include a side cover. Referring to FIGS. 2 and 3, for example, the side cover may be provided in a shape such that a side surface of the backlight unit 200, the touch wing portion 320 and the dummy wing portion 330 are surrounded thereby. The side cover may protect the backlight unit 200, the touch wing portion 320 and the dummy wing portion 330 against external shock thereto.

Figure 5:
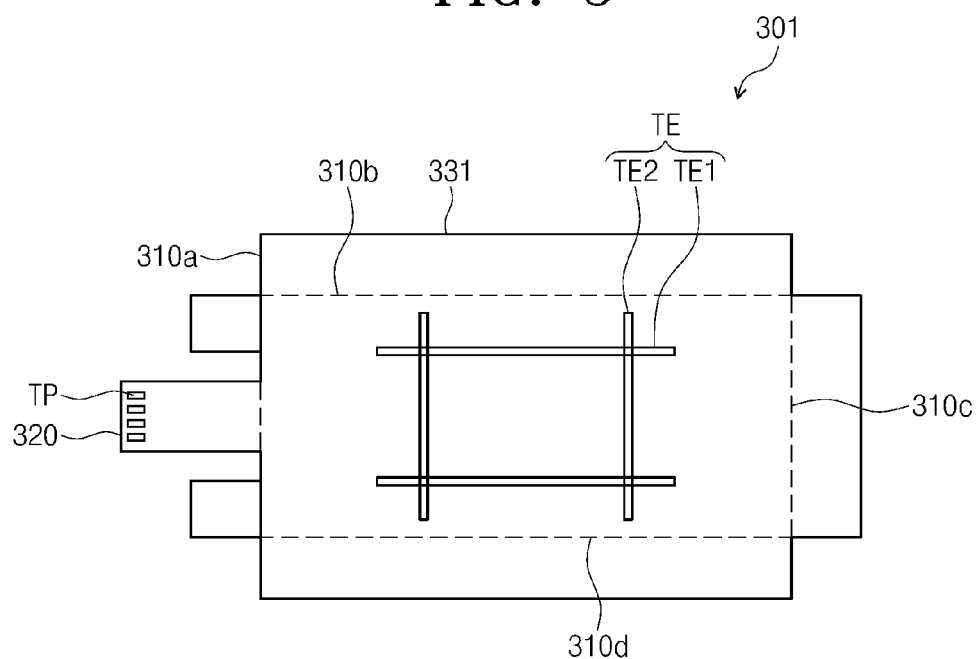
FIG. 5 is a plan view of another exemplary embodiment of a touch panel according to the invention.

FIG. 5 is a plan view of another exemplary embodiment of a touch panel according to the invention.

The touch panel 301 in FIG. 5 has a different shaped dummy wing portion 331 in comparison to the touch panel 300 in FIG. 4. In FIG. 5, dummy wing portions 331 may extend in a perpendicular direction from each of the second to fourth sides 310b to 310d of the base portion 310 and have the same length as each of the second to fourth sides 310b to 310d. A dummy wing portion similar to that of 330 in FIG. 4 may be provided at the first side 310a, but the invention is not limited thereto. In an exemplary embodiment, the dummy wing portion 330 may be omitted at the first side 310a in favor of the touch panel 301 including only the touch wing portion 320 at the first side 310a, while the dummy wing portions 331 are disposed at the second to fourth sides 310b to 310d.

Figure 6:
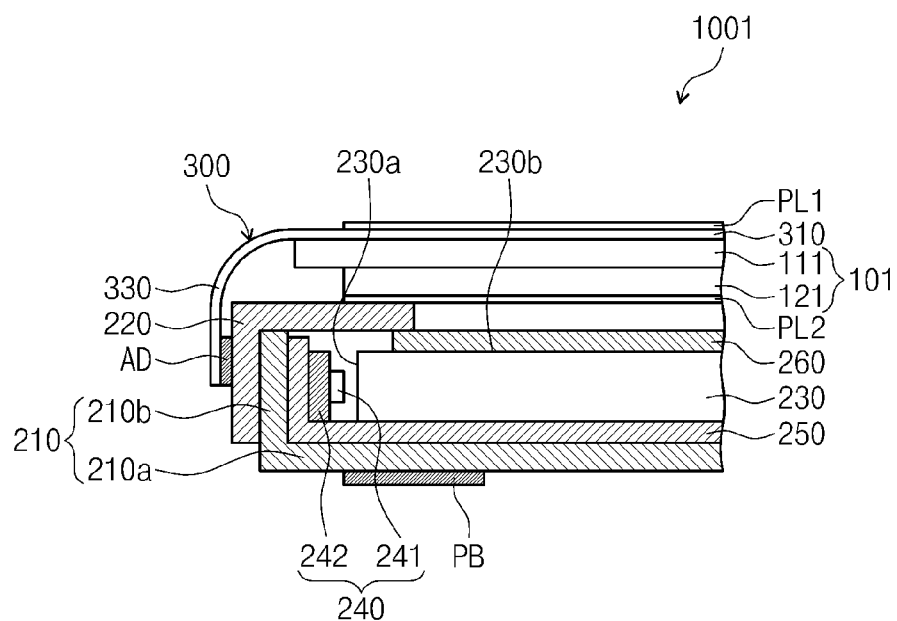
FIG. 6 is a cross-sectional view of another exemplary embodiment of a display apparatus according to the invention.

FIG. 6 is a cross-sectional view of another exemplary embodiment of a flexible display apparatus according to the invention. FIG. 6 is a cross-sectional view taken along line I-I' of FIG. 1.

The display apparatus 1001 illustrated in FIG. 6 is different in from the display apparatus 1000 described with reference to FIGS. 1 to 3 relating to a display panel 101. Locations of first display substrate 111 and second display substrate 121 of the display panel 101 in FIG. 6 may be exchanged as compared to locations of first display substrate 110 and second display substrate 120 of the display panel 100 in FIGS. 1 and 3.

The first display substrate 111 may be disposed between the second display substrate 121 and the touch panel 300. That is, elements of the display apparatus 1001 may be disposed in order of the backlight unit 200, the second display substrate 121, the first display substrate 111 and the touch panel 300 taken in a direction from a rear of the display apparatus 1001 to the front of the display apparatus 1001.

Figure 7:
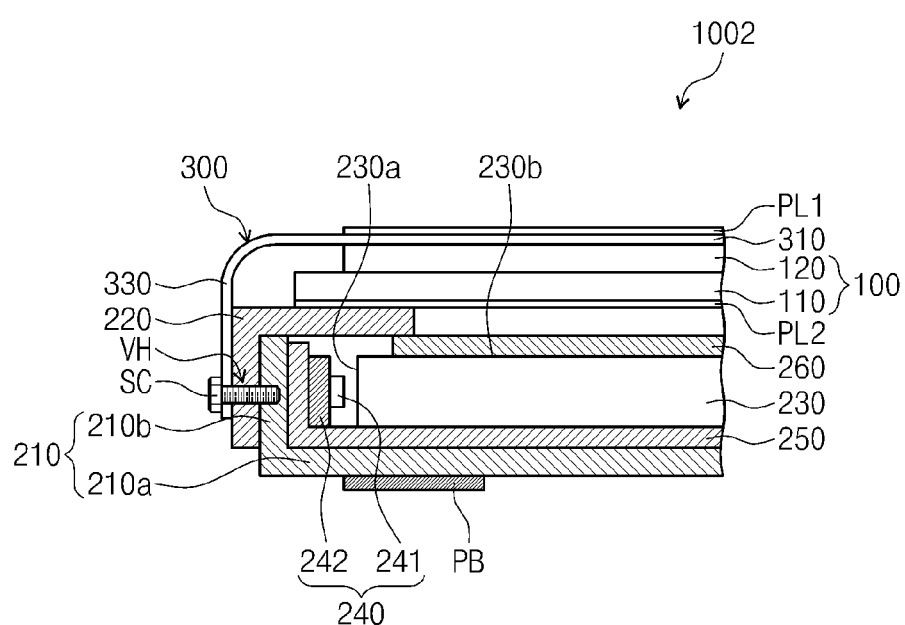
FIG. 7 is a cross-sectional view of still another exemplary embodiment of a display apparatus according to the invention.

FIG. 7 is a cross-sectional view of still another exemplary embodiment of a display apparatus according to the invention. FIG. 7 is a cross-sectional view taken along line I-I' of FIG. 1.

The display apparatus 1002 in FIG. 7 is different from the display apparatus 1000 described with reference to FIGS. 1 to 3 in that the display apparatus 1002 has a modified structure which attaches a dummy wing portion 330 to a middle mold 220.

The display apparatus 1002 may further include a coupling member SC. The coupling member SC may fix the dummy wing portion 330 to the middle mold 220. The coupling member SC may pass through a via hole VH defined in the dummy wing portion 330 to be inserted into the middle mold 220. The coupling member SC may be a rivet or a screw, but the invention is not limited thereto or thereby.

According to one or more exemplary embodiment of the invention, a separate top chassis may be omitted from the display apparatus, thereby reducing the overall cross-sectional thickness and planar size of the bezel of the display apparatus and also reducing manufacturing costs. Furthermore, the flexible printed circuit board connected to the touch panel may be omitted to further reduce manufacturing costs and simplify manufacturing processes.

The scope of the invention is not limited to the exemplary embodiment described above but is defined by the appended claims. It is evident, however, that many alternative modifications and variations will be apparent to those having skill in the art in light of the foregoing description. Accordingly, the disclosure embraces all such alternative modifications and variations as fall within the spirit and scope of the appended claims.

What is claimed is:

1. A display apparatus, comprising:
   a display panel which displays an image;

a backlight unit which generates and provides light, the backlight unit disposed below the display panel to provide the light to the display panel; and a touch panel which senses a touch input to the display apparatus, wherein the touch panel comprises a base film attached to a top surface of the display panel, the base film defining a base portion thereof which is overlapped with the display panel; and the base portion which is overlapped with the display panel is extended to define a dummy wing portion of the base film, the dummy wing portion bent from the display panel to a side surface of the backlight unit and fixed to the side surface of the backlight unit.

2. The display apparatus of claim 1, wherein the base portion which is overlapped with the display panel is further extended to define a touch wing portion, the touch wing portion spaced apart from the dummy wing portion; and the touch panel further comprises:

a touch electrode disposed on the base portion which is overlapped with the display panel; and a touch pad disposed on the touch wing portion and connected to the touch electrode.

3. The display apparatus of claim 2, further comprising a printed circuit board disposed under the backlight unit, wherein the touch wing portion is bent from the display panel to be attached to the printed circuit board disposed under the backlight unit.

4. The display apparatus of claim 2, wherein the base portion, the touch wing portion and the dummy wing portion are integral with each other.

5. The display apparatus of claim 2, wherein the touch wing portion and the dummy wing portion are each extended from a same side of the base portion of the base film, the touch wing portion has a first length in a direction perpendicular to an extension direction of the same side of the base portion, and the dummy wing portion has a second length less than the first length in the direction perpendicular to the extension direction of the same side of the base portion.

6. The display apparatus of claim 1, wherein the backlight unit comprises:

a bottom chassis including a bottom surface, and a sidewall extending from an edge of the bottom surface;

a middle mold which is connected to an outer portion of the bottom chassis and supports the display panel thereon;

a light guide plate which is accommodated in the bottom chassis and guides incident light thereto to emit the incident light toward the display panel; and a light source unit which generates and provides light to the light guide plate.

7. The display apparatus of claim 6, wherein the dummy wing portion which is bent from the display panel to the side surface of the backlight unit is fixed to the middle mold of the backlight unit.

8. The display apparatus of claim 7, further comprising an adhesive part disposed between the dummy wing portion and the middle mold to fix the dummy wing portion to the middle mold.

9. The display apparatus of claim 8, wherein the adhesive part comprises optical clear adhesive or optical clear resin.

10. The display apparatus of claim 7, further comprising a coupling member which passes through the dummy wing portion to be inserted into the middle mold to fix the dummy wing portion to the middle mold.

11. The display apparatus of claim 10, wherein the coupling member comprises a rivet or a screw.

12. The display apparatus of claim 6, wherein the backlight unit further comprises:

a heat extrusion bar which fixes the light source unit relative to other elements of the backlight unit; and an optical sheet disposed on the light guide plate.

13. The display apparatus of claim 1, wherein the display panel comprises:

a first display substrate including a gate line, a data line and a thin film transistor;

a second display substrate facing the first display substrate; and a liquid crystal layer disposed between the first display substrate and the second display substrate.

14. The display apparatus of claim 13, wherein the first display substrate is disposed on the backlight unit, and the second display substrate is disposed between the first display substrate and the touch panel.

15. The display apparatus of claim 13, wherein the second display substrate is disposed on the backlight unit, and the first display substrate is disposed between the second display substrate and the touch panel.

16. A display apparatus, comprising:

a display panel which displays an image;

a backlight unit which generates and provides light, the backlight unit disposed below the display panel to provide the light to the display panel; and a touch panel which senses a touch input to the display apparatus, the touch panel attached to the display panel, wherein portions of the touch panel attached to the display panel are bent in a thickness direction of the display panel and fixed to a side surface of the backlight unit.

17. The display apparatus of claim 16, wherein the touch panel comprises:

a base film defining a base portion thereof which is attached to a top surface of the display panel; and the base portion which is attached to the top surface of the display panel is extended to define a dummy wing portion of the base film, the dummy wing portion bent from the display panel to the side surface of the backlight unit and fixed to the side surface of the backlight unit.

18. The display apparatus of claim 17, wherein the base portion which is attached to the top surface of the display panel is further extended to define a touch wing portion, the touch wing portion spaced apart from the dummy wing portion; and the touch panel comprises:

a touch electrode disposed on the base portion which is attached to the top surface of the display panel; and a touch pad disposed on the touch wing portion and connected to the touch electrode.

* * * * *